US008618473B2

(12) United States Patent
Steiner

(10) Patent No.: US 8,618,473 B2

(45) Date of Patent: Dec. 31, 2013

(54) MASS SPECTROMETER WITH PRECISELY ALIGNED ION OPTIC ASSEMBLIES

(75) Inventor: Urs Steiner, Branford, CT (US)

(73) Assignee: Bruker Daltonics, Inc., Billerica, MA (US)

( * ) Notice: Subject to any disclaimer, the term of this patent is extended or adjusted under 35 U.S.C. 154(b) by 0 days.

(21) Appl. No.: 13/366,713

(22) Filed: Feb. 6, 2012

(65) Prior Publication Data

US 2013/0015347 A1 Jan. 17, 2013

Related U.S. Application Data

(60) Provisional application No. 61/508,005, filed on Jul. 14, 2011.

(51) Int. Cl.
*B01D 59/44* (2006.01)

(52) U.S. Cl.
USPC .......................................................... 250/281

(58) Field of Classification Search
USPC .................. 250/281, 282, 286, 291, 292, 293
See application file for complete search history.

(56) References Cited

U.S. PATENT DOCUMENTS 4,963,736 A 10/1990 Douglas
5,384,461 A * 1/1995 Jullien et al. .................. 250/292
5,559,327 A 9/1996 Steiner
5,652,427 A 7/1997 Whitehouse
5,939,718 A * 8/1999 Yamada et al. ............... 250/288
6,025,591 A * 2/2000 Taylor et al. .................. 250/292
6,576,897 B1 6/2003 Steiner et al.
6,797,948 B1 9/2004 Wang
6,989,533 B2 * 1/2006 Bellec et al. .................. 250/291
7,012,250 B1 3/2006 Aksyuk et al.
7,435,952 B2 * 10/2008 Finlay et al. .................. 250/292
7,893,407 B2 * 2/2011 Syms ........................ 250/396 R
2003/0136905 A1 * 7/2003 Franzen et al. ............... 250/292
2006/0192108 A1 * 8/2006 Yeatman et al. .............. 250/288
2008/0203287 A1 * 8/2008 Crawford ...................... 250/282
2010/0276591 A1 * 11/2010 Finlay .......................... 250/292
2010/0327156 A1 12/2010 King

FOREIGN PATENT DOCUMENTS

GB 2391694 A1 2/2004
GB 2422951 A1 8/2006
GB 2490792 A1 11/2012
JP 8329884 A1 12/1996

* cited by examiner

*Primary Examiner* — Robert Kim
*Assistant Examiner* — Jason McCormack
(74) *Attorney, Agent, or Firm* — Robic, LLP

(57) ABSTRACT

A mass spectrometer has a manifold and at least one ion optical assembly that is composed of a support and electrodes attached to the support. The support is aligned to at least one reference surface machined integrally with the manifold such that the number of interfaces between the reference surface of the manifold and the electrodes is minimized. With such a design the positional and/or alignment precision of ion optical assemblies in a mass spectrometer can be improved.

17 Claims, 9 Drawing Sheets

MASS SPECTROMETER WITH PRECISELY ALIGNED ION OPTIC ASSEMBLIES

BACKGROUND

The invention relates to mass spectrometers having multiple ion optical assemblies and to means for positioning the multiple ion optical assemblies in the mass spectrometer. Mass spectrometry is a well-known technique for identifying the chemical composition of a sample based on the mass-to-charge (m/z) ratio of ions. Analyzing a sample using mass spectrometry generally consists of three steps: (a) formation of gas phase ions from sample, (b) mass analysis of the ions to separate the ions from one another according to ion mass, and (c) detection of the ions. Further functions may consist in guiding ions from the ion source to a mass analyzer, including a spatial and temporal shaping of guided stream of ions, or in fragmenting ions, for example by CID (collision induced dissociation) with background gas. These functions are performed by several methods and means existing in the field of mass spectrometry including ion optical assemblies, such as ion sources, RF (radio frequency) multipole ion guides, RF stacked ring ion guides, quadrupole mass filters, two- or three dimensional RF ion traps, DC focusing lenses and DC electrodes for guiding or accelerating ions, to name some examples.

The ion source assembly in a mass spectrometer is selected, for example, according to the chemical class of analytes to be ionized, the mass range of the analytes and the mass analyzer used for analyzing the ions. Commonly used ionization techniques are, for example, electron impact ionization (EI), chemical ionization (CI), matrix assisted laser desorption/ionization (MALDI) and electrospray ionization (ESI). The different ion sources do not only differ in the ionization mechanism, but also in the pressure regime the ionization takes place. For example, an ESI source will almost always be operated at atmospheric pressure, whereas an EI source is operated at a lower pressure (in a medium to high vacuum). Other ion sources, like MALDI and CI, can be operated at different pressures ranging from atmospheric pressure up to pressures of medium vacuum ($10^3$ to $10^{-1}$ Pa), or in case of MALDI even in a high vacuum ($10^{-1}$ to $10^{-7}$ Pa).

A mass analysis can be performed by a plurality of different mass analyzers, like time-of-flight mass analyzers, quadrupole mass filters, ion cyclotron resonance mass analyzers, magnetic and electric sector mass analyzers, RF quadrupole ion trap mass analyzer and electrostatic ion traps. Generally, mass analyzers operate in a high vacuum depending on the type of mass analyzer used.

Some very common mass spectrometers even comprise more than one mass analyzer. For example, time-of-flight mass analyzers with orthogonal ion injection (OTOF) are coupled to a quadrupole mass filter (Q) and a gas filled quadrupole collision cell (QqOTOF). In the case of a triple quadrupole mass spectrometer, one of the types of mass spectrometer most often sold, the mass spectrometer comprises three quadrupoles arranged in series. The first quadrupole (Q1) and the third quadrupole (Q3) act as quadrupole mass filters. The middle quadrupole (Q2) is a gas filled collision cell for inducing fragmentation of precursor ions selected in the first quadrupole. Subsequently, fragments are passed through to the third quadrupole where ions may be filtered or scanned fully. Since the quadrupole mass filters (Q1, Q3) are operated at high vacuum, whereas the quadrupole collision cell (Q2) is at medium vacuum pressure, the quadrupoles are frequently positioned in separate chambers (different vacuum stages) of the mass spectrometers. The ions are often transferred between these chambers by DC lenses gathering the ions at the end of a quadrupole and focusing them to the entrance of the adjacent quadrupole. However, there are triple quadrupole mass spectrometers in which all three quadrupoles are positioned in a single chamber (U.S. Pat. No. 6,576,897).

If the ions are generated in an ion source with an elevated pressure compared to the mass analyzer, the ions must be transported to the vacuum for mass analysis. In order for the gas phase ions to enter the mass analyzer, the ions must be separated from the background gas introduced by the operation of the ion source and transported through the single or multiple vacuum stages (compartments) of the mass spectrometer. The use of RF multipole ion guides has been shown to be an effective means for transporting ions, being generated in an ion source at atmospheric pressure and transferred into a low vacuum stage, from the low vacuum stage into high vacuum stages. Douglas et al. (U.S. Pat. No. 4,963,736) disclose a RF quadrupole ion guide that is used to transportions with high efficiency from a medium vacuum stage to a high vacuum stage with a quadrupole mass filter. Whitehouse et al. (U.S. Pat. No. 5,652,427) disclose RF multipole ion guides which begin in a first vacuum stage and extend continuously into one or more subsequent vacuum stages ending at the mass analyzer. In addition to being used for their transfer function, RF multipole devices known in the art, like RF multipole rod sets or RF stacked rings, can further be configured as gas collision cells for CID or as ion traps for fragmenting ions by ion-ion reactions, like ETD (electron transfer dissociation).

All ion optical assemblies of a mass spectrometer have to be precisely aligned with respect to each other in order to achieve a good performance for the whole mass spectrometer. The position accuracy between the ion optical assemblies can strongly affect the lower limit of detection and the mass resolution of the mass spectrometer, but also the mean time between maintenance. The latter is due to contaminations resulting from ion optical assemblies not being aligned in a proper way. The ion optical assemblies are often pre-assembled such that the components of the assemblies, like electrodes and supports, are precisely aligned with respect to each other.

In the prior art, like for example in the U.S. Pat. No. 6,797,948, the ion optical assemblies are aligned using aligning structures attached to the inside of the housing of the mass spectrometer, such as benches, to which all of the ion optical assemblies are mounted. However, these benches are unfavorable when the mass spectrometer comprises multiple vacuum stages and thus chambers, because the bench has either to be fed through the walls separating the chambers or has to be divided into multiple separated benches. The feedthroughs are disadvantageous due to the complexity of sealing the bench at the feedthroughs, whereas separated benches lose the advantage of having all ion optical assemblies aligned to the same bench, that is, the same frame of reference.

Ion optical assemblies of a mass spectrometer can further be aligned by attaching them to mounting means (separately manufactured holders and stands) which are again mounted on the inside of the housing of the mass spectrometer. Using mounting means has the disadvantage that there are multiple mechanical interfaces between the housing and the electrodes, as functional components of the ion optical assembly. A high number of interfaces results in a tolerance buildup that reduces the position accuracy of an ion optical assembly and the position accuracy between ion optical assemblies. The tolerance buildup can only be reduced by specifying the dimensions with very tight tolerances.

The U.S. Patent Application 2010/0327156 discloses another alternative for a precise alignment of ion optical assemblies. Here, the mass spectrometer comprises a housing with a panel wherein the panel is movable between an open and closed position relative to the housing. A first ion optical assembly is within the housing, while a second ion optical assembly is mounted to the panel. The ion optical assemblies are surrounded by the housing and the panel when the panel is in a closed position. An alignment mechanism aligns the first and second ion optical assemblies into a pre-determined alignment upon closing the panel.

Besides affecting the performance of the mass spectrometer, the alignment and mounting of the ion optical assemblies also affect the cost of production because this final assembly is time consuming and thus an expensive manufacturing step. It would be desirable to provide a mass spectrometer that can be assembled from pre-aligned ion optical assemblies rapidly while still maintaining high positional accuracy of the ion optical assemblies.

SUMMARY

The following summary is included in order to provide a basic understanding of some aspects and features of the disclosure. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

In a first aspect, the invention provides a mass spectrometer comprising a manifold and at least one ion optical assembly, wherein the ion optical assembly comprises a support and electrodes attached to said support, the manifold comprises at least one reference surface that is integrally machined with the manifold and the support is aligned to the at least one reference surface such that a number of interfaces between the reference surface of the manifold and the electrodes is minimized. Multiple ion optical assemblies can be precisely and reproducibly aligned to each other by aligning the supports of the ion optical assemblies to corresponding reference surfaces of the manifold. The aligned support can further be rigidly attached to the at least one reference surface, or to another part of the manifold, by one of: adhesion, screwing and clamping. This list is not to be construed restrictive. Other attachment means are also conceivable. Each of the ion optical assemblies can be one of an ion source, an RF multipole ion guide, an RF stacked ring ion guide, a quadrupole mass filter, two or three dimensional RF ion traps, an RF multipole collision cell, a DC lens and DC electrodes for orthogonally accelerating ions to an ion detector or into flight tubes of a time-of-flight analyzer, to name just a few examples.

The manifold is preferably a single machined work piece, most preferably machined completely in one milling machine and in a single clamping. The accuracy of the shape and position of the reference surface on the manifold may be better than hundred micrometers, preferably better than ten micrometers for each reference surface and can even be better than 5 micrometers. This high precision of the manifold and the reference surface results in an accurate and reproducible positioning of an ion optical assembly (or more than one ion optical assembly) and between ion optical assemblies wherein the accuracy is preferably better than 500 micrometers, more preferably better than 100 micrometers and can even reach a positioning accuracy of 20 micrometers.

The reference surface can be a recess or a substantially plane surface at one of a post, step and plateau machined integrally with the manifold. Furthermore, the manifold preferably comprises walls and a ground plate forming part of a housing of the mass spectrometer. The housing may be sealingly closed by a cover plate on the manifold. The walls of the housing have preferably a height of less than 8 centimeters; and the manifold has a volume of less than 8,000 cubic centimeters in order to keep the load on the vacuum pump low. In case that the mass spectrometer comprises different vacuum stages, the walls of these vacuum stages can also be integrally machined with the manifold, thus providing a highly stable design. Consequently, the reference surfaces can also be substantially plane surfaces at one of a step and plateau machined integrally with these walls, or ground plate.

The reference surface can be substantially planar and comprises at least one pin protruding therefrom. Furthermore, the support can comprise corresponding recesses or openings for aligning the support in directions essentially parallel to the reference surface such that the ion optical assembly is aligned in more than one dimension.

In a first embodiment, the ion optical assembly is a RF multipole electrode assembly and the support is a substantially planar printed circuit board, wherein the electrodes are mounted on a same surface of the printed circuit board which is aligned to the reference surface.

In a second embodiment, the ion optical assembly is a quadrupole mass filter having four rods and the support comprises insulating rings attached to and holding the rods, wherein the rings have at least one common straight edge at an outer periphery for aligning the quadrupole mass filter to a substantially plane reference surface, such as located on a wall and/or ground plate of the housing of the manifold. The support preferably comprises a ceramic ring.

In a third embodiment, the ion optical assembly is a RF multipole rod assembly and the support comprises insulating rings attached to and holding the rods, wherein the rings have at least one common straight edge at an outer periphery being aligned to a substantially plane reference surface.

In a second aspect, the invention provides a mass spectrometer comprising a manifold and at least one ion optical assembly, wherein the ion optical assembly comprises a support, electrodes being attached to said support, and an adjustment surface to which the electrodes are aligned, the manifold comprises a reference surface machined integrally with the manifold, and the adjustment surface is aligned to the reference surface such that a number of interfaces between the reference surface and the adjustment surface is minimized.

In various embodiments the adjustment surface is machined at the support. The support may be one of an insulating ring and a circuit board. Moreover, the reference surface and the adjustment surface can contact each other over a surface area.

The main advantages of mass spectrometers according to the invention are that their ion optical assemblies can be accurately and reproducibly aligned to each other with a precision that is substantially only limited by the manufacturing precision of the manifold. The positioning accuracy can even be achieved when the ion optical assemblies are located in different vacuum chambers of the mass spectrometer.

BRIEF DESCRIPTION OF THE DRAWINGS

The invention can be better understood by referring to the following figures. The components in the figures are not necessarily to scale, emphasis instead being placed upon illustrating the principles of the invention (often schematically). In the figures, like reference numerals designate corresponding parts throughout the different views.

DETAILED DESCRIPTION

While the invention has been shown and described with reference to a number of embodiments thereof, it will be recognized by those skilled in the art that various changes in form and detail may be made herein without departing from the spirit and scope of the invention as defined by the appended claims.

Figure 1:
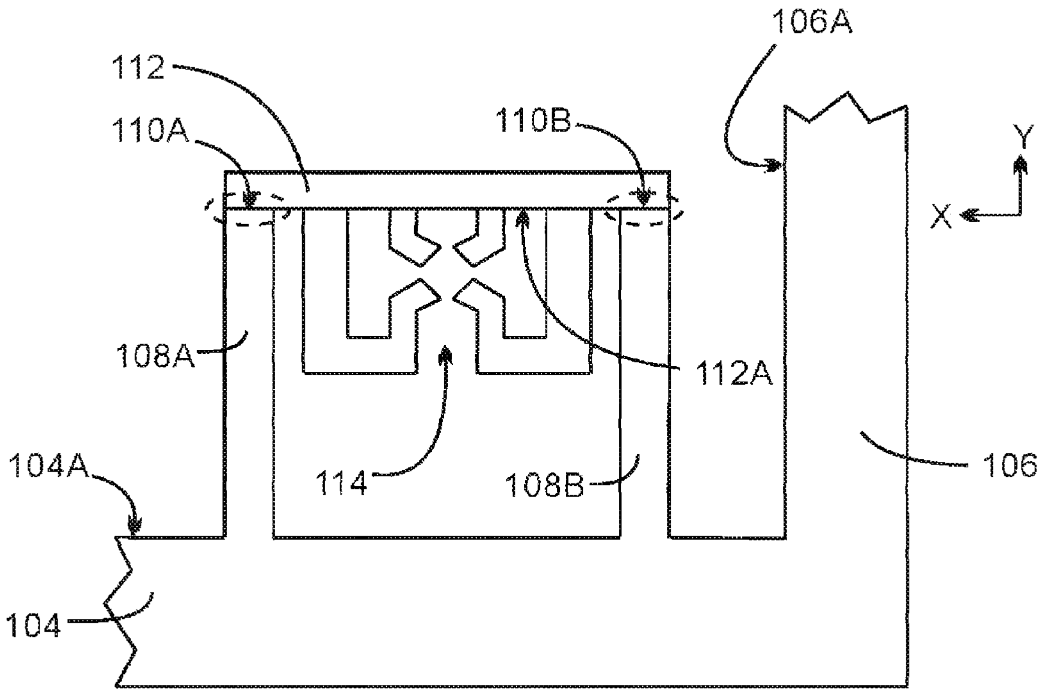
FIG. 1 shows an embodiment of the invention.

FIG. 1 shows an exemplary embodiment of the mass spectrometer according to the invention in a two-dimensional front view. The mass spectrometer extends perpendicularly to the plane of the paper and longitudinally into the paper. A ground plate 104 and a side wall 106 of a housing for a recipient or manifold form a spatial constriction for the mass spectrometer and serve, for example, for creating compartments for different vacuum stages. Two posts 108A, 108B are integrally machined with the housing (the ground plate in this case), each featuring an essentially flat and highly precise machined reference surface 110A, 110B on top thereof. The reference surfaces 110A, 110B are in this case coplanar with an upper surface 104A of the ground plate 104 and essentially perpendicular to an inner side surface 106A of the adjacent wall 106. However, this arrangement is not to be construed restrictive. Other, for instance inclined, alignments are also conceivable.

A carrier or support plate 112, such as a printed circuit board (PCB), preferably made of an insulating material, for example plastic, rests with one of its surfaces 112A on both top reference surfaces 110A, 110B of the posts 108A, 108B. An electrode structure 114 is attached to the same surface 112A of the carrier plate 112, by adhesive bonding or mechanical connection such as screwing or clamping, in a pendant manner. That is, in the embodiment shown the electrodes 114 protrude from the surface 112A of the carrier plate 112 downward in the direction of the ground plate 104.

The electrode structure 114, in this example, constitutes a quadrupole which, when supplied with appropriate direct current (DC) and/or radio frequency alternate current (RF-AC) voltages, may be used as an ion guide, a mass filter, a collisional dissociation cell, a collisional cooling cell or the like (electrical supply lines not shown for the sake of clarity). The inner end of each quadrupole electrode has essentially a square cross section, and the single electrodes, in this case, are individually supported by the circuit board 112. Due to the pendant arrangement of the electrodes on one surface 112A of the circuit board 112, and due to the circuit board 112 as support resting with the same surface 112A on the high-precision top reference surfaces 110A, 110B of the two posts 108A, 108B, the number of interfaces between the electrode assembly 114 and the manifold is favorably minimized, in this example to one (as indicated by the dashed ellipses). This means that just one of the side faces of the circuit board 112 has to be machined to high precision in order to minimize position uncertainties of the electrode assembly 114 in relation to the manifold in the Y direction, at least. Therefore, the manifold, or at least the part at which the reference surface 110A, 1108 is located, may act as a reliable reference frame for mounting and aligning ion optical assemblies such as the quadrupole illustrated.

In the exemplary design of FIG. 1 the circuit board 112 could be screwed to the posts 108A, 108B in a releasable mechanical connection, for example. Gluing the circuit board 112 to the posts 108A, 108B on the reference surfaces 110A, 1108 would be an example of an unreleasable connection directly on the reference surfaces 110A, 1108. However, the alignment of an ion optical assembly on a reference surface machined integrally with a manifold does not necessarily include providing a rigid connection of the ion optical assembly with the reference surface itself. It is possible simply to align the ion optical assembly on the reference surface without fixing it thereon. The fixing or mounting may actually be effected by other means in other regions of the manifold spaced apart from the position of the reference surface. Clamps (not shown), for instance, would be an example of a mechanical connection with which the circuit board 112 could be fixed to the manifold with the reference surfaces 110A, 1108 not being involved in the fixing or mounting.

Figure 2:
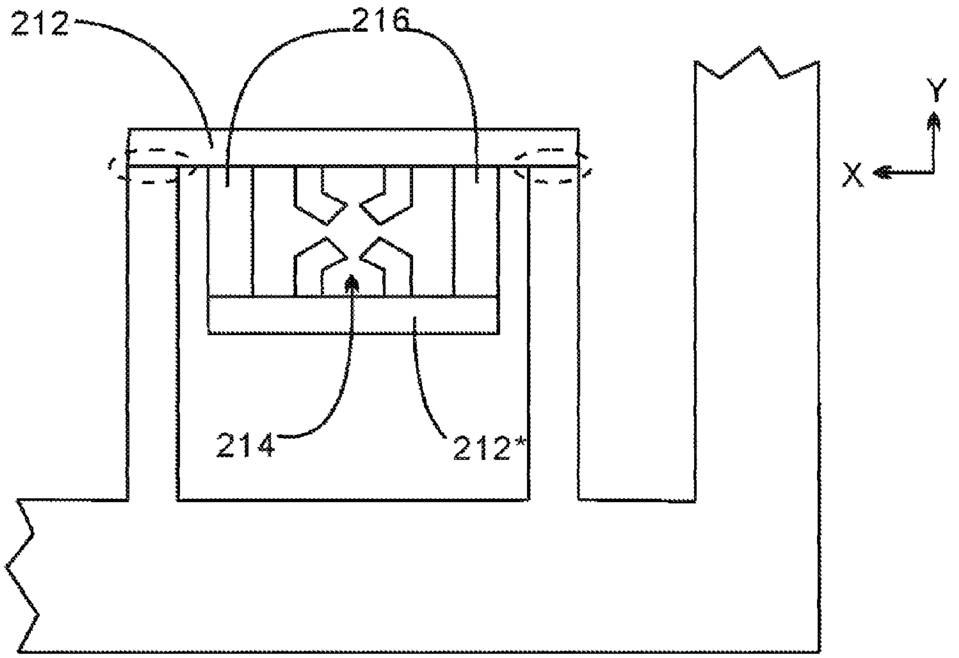
FIG. 2 shows a variant of the embodiment of FIG. 1.

The embodiment shown in FIG. 2 varies the embodiment of FIG. 1 insofar as the electrodes 214 are not all directly attached to the same side surface of the circuit board 212 (support plate). Two of the electrodes (the upper ones) are still directly attached to it whereas the other two (the lower ones) are attached to a second circuit board 212* that forms essentially a sandwich arrangement with the first circuit board 212. The second circuit board 212* is supported by the first circuit board 212 via two support arms 216. In this example, the first and second circuit boards 212, 212*, the support arms 216 and the electrodes 214 form a sub-assembly in the mass spectrometer featuring an inherent position and/or alignment precision. This inherent precision of the sub-assembly essentially includes position and/or alignment precisions of the two pairs of electrodes mounted on separate surfaces. The inherent precision of the sub-assembly is generally independent of the position and alignment precision of the sub-assembly as a whole in relation to the manifold. The latter precision is reduced to a minimum as the number of interfaces between the sub-assembly as a whole and the manifold is minimized, again to a number of one in this example (as indicated by the dashed ellipses).

Figure 3:
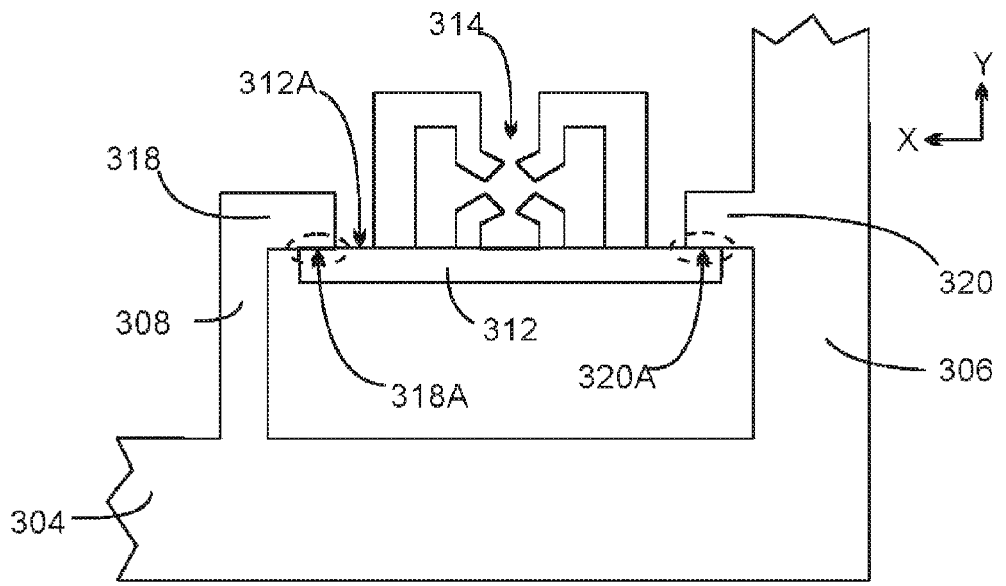
FIG. 3 shows another embodiment of the invention.

FIG. 3 shows another exemplary embodiment of the mass spectrometer according to the invention in a two-dimensional front view. A ground plate 304 and a side wall 306 of a housing for a recipient or manifold have a post 308 integrally machined with the ground plate 304, in this case, and featuring a top part 318 with an undercut, and a rectangular protrusion 320 integrally machined with the side wall 306. Each has an essentially flat and highly precise machined reference surface 318A, 320A facing downward in the direction of the ground plate 304, in this example.

A circuit board 312 supports the electrodes 314 in a erect fashion, and contacts with one of its surfaces 312A, facing upward in this example, the two downwardly facing reference surfaces 318A, 320A at the undercut of the post 308 and the protrusion 320. In certain embodiments, when the circuit board 312 not only contacts the reference surfaces 318A, 320A but is also fixed thereto, the mounting could be called pendant for the circuit board 312 and erect for the electrodes 314.

Due to the erect arrangement of the electrodes 314 on one surface 312A of the circuit board 312, and due to the circuit board 312 contacting with the same surface 312A the high-precision downwardly facing reference surfaces 318A, 320A of the post 308 and the protrusion 320, respectively, the number of interfaces between the electrode assembly 314 and the manifold is favorably minimized, in this example again to one. Accordingly, just one of the side faces 312A of the circuit board 312 has to be machined to high precision in order to minimize position uncertainties of the electrode assembly 314 in relation to the manifold in the Y direction, at least. Therefore, the manifold, or at least the part at which the downward facing reference surfaces 318A, 320A are located, may act as a reliable reference frame for mounting and aligning ion optical assemblies such as the quadrupole illustrated in the example.

Figure 4:
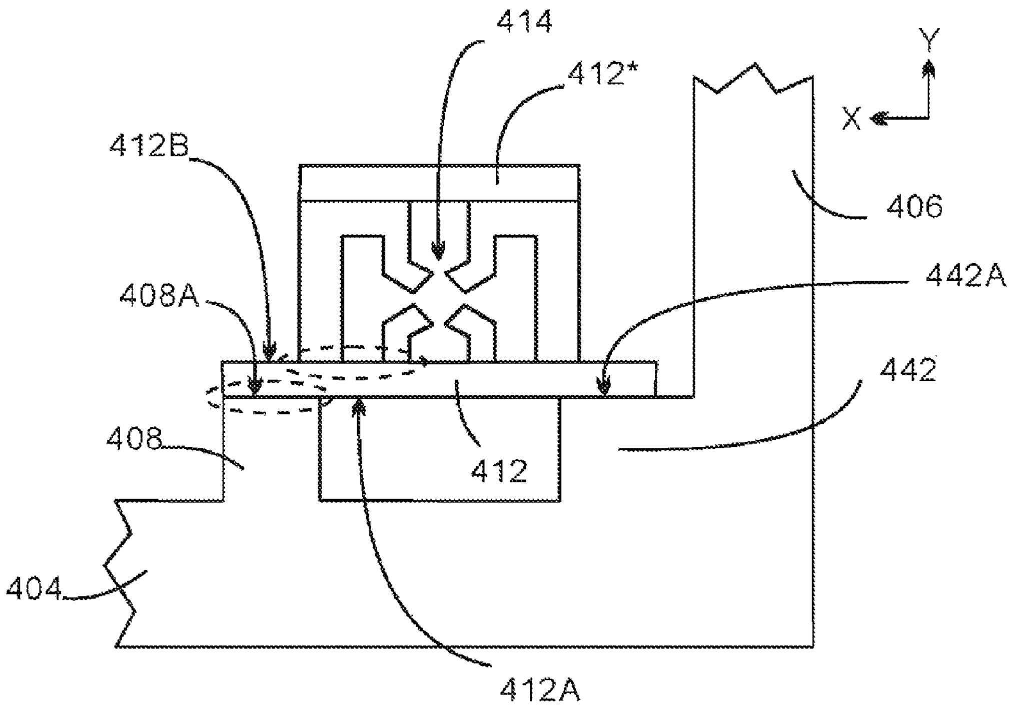
FIG. 4 shows another exemplary implementation of the invention.

FIG. 4 shows another exemplary implementation of the mass spectrometer according to the invention in a two-dimensional front view. A ground plate 404 and a side wall 406 of a housing for a recipient or manifold have a post 408 integrally machined with the ground plate 404, in this case, and a rectangular step 442 integrally machined with the side wall 406 and the ground plate 404. Each has an essentially flat and highly precise machined reference surface 408A, 442A facing upward, in this example.

A circuit board 412 supporting the electrode structure 414 contacts with one of its surfaces 412A, facing downward in this example as assembled, the two upwardly facing reference surfaces 408A, 442A at the post 408 and the step 442. The electrode structure 414 is, by way of example, attached to, and preferably accurately aligned with, the other side face 4128 of the circuit board 412 in a erect fashion. A second circuit board 412* rests on top of the upper electrodes in a sandwich-like arrangement assisting in providing a closed design, in particular with regard to gas conductance, of the electrode structure 414 on the circuit boards 412, 412*.

Due to the erect arrangement of the electrode structure 414 on one surface 412B of the circuit board 412, and due to the circuit board 412 contacting with the other side face 412A the high-precision upwardly facing reference surfaces 408A, 442A of the post 408 and the step 442, respectively, the number of interfaces between the electrode assembly 414 and the manifold is favorably minimized, in this example to two (dashed ellipses). Accordingly, just the two side faces 412A, 412B of the circuit board 412 (or in other words, the thickness of the circuit board 412) have to be machined to high precision in order to reduce position uncertainties of the electrode assembly 414 in relation to the manifold in the Y direction, at least. Therefore, the manifold, or at least the part at which the upward facing reference surfaces 408A, 442A are located, may act as a reliable reference frame for mounting and aligning ion optical assemblies such as the quadrupole illustrated in the example without incurring potentially disturbing precision tolerance buildup.

Minimizing the number of interfaces between the manifold and an electrode structure has the positive effect that, in comparison with previously employed arrangements, when two ion optical assemblies are positioned in series, the optical axes of the ion optical assemblies, conventionally representing the axes of ion transport, show a higher degree of colinearity, so that a transfer efficiency of ions in the mass spectrometer, when the ions transit from one ion optical assembly to the next, is increased.

The increased number of interfaces between the manifold and an electrode structure, present in previously employed designs having separate stand-off posts, creates additional positional and/or alignment errors that add up to the overall alignment imprecision of the whole mass spectrometer. This can result in the ion optical axes of two serial ion optical assemblies being offset to one another. An offset is, however, just one example of an alignment and/or position error. The additional number of interfaces could also lead to an enhanced inclination of two optical axes in relation to one another. These additional alignment and/or positional error contributions decrease the ion throughput efficiency of the mass spectrometer in the sense that, when ions transit from one ion optical assembly to the other, some ions are removed from the ion beam and hence do not reach an ion optical detector.

According to embodiments of the invention, such as those having a pendant arrangement of the electrode structure shown previously, the minimized number of interfaces between the manifold and the electrode structure, as indicated by the dashed ellipses, reduces positional and/or alignment uncertainties of the ion optical assemblies and their mounting structure, thereby contributing less to the overall imprecision of alignment and/or position of the mass spectrometer which, as a result, is smaller compared to the prior art. Consequently, the ion throughput efficiency between different ion optical assemblies in the mass spectrometer is favorably increased.

Figure 5:
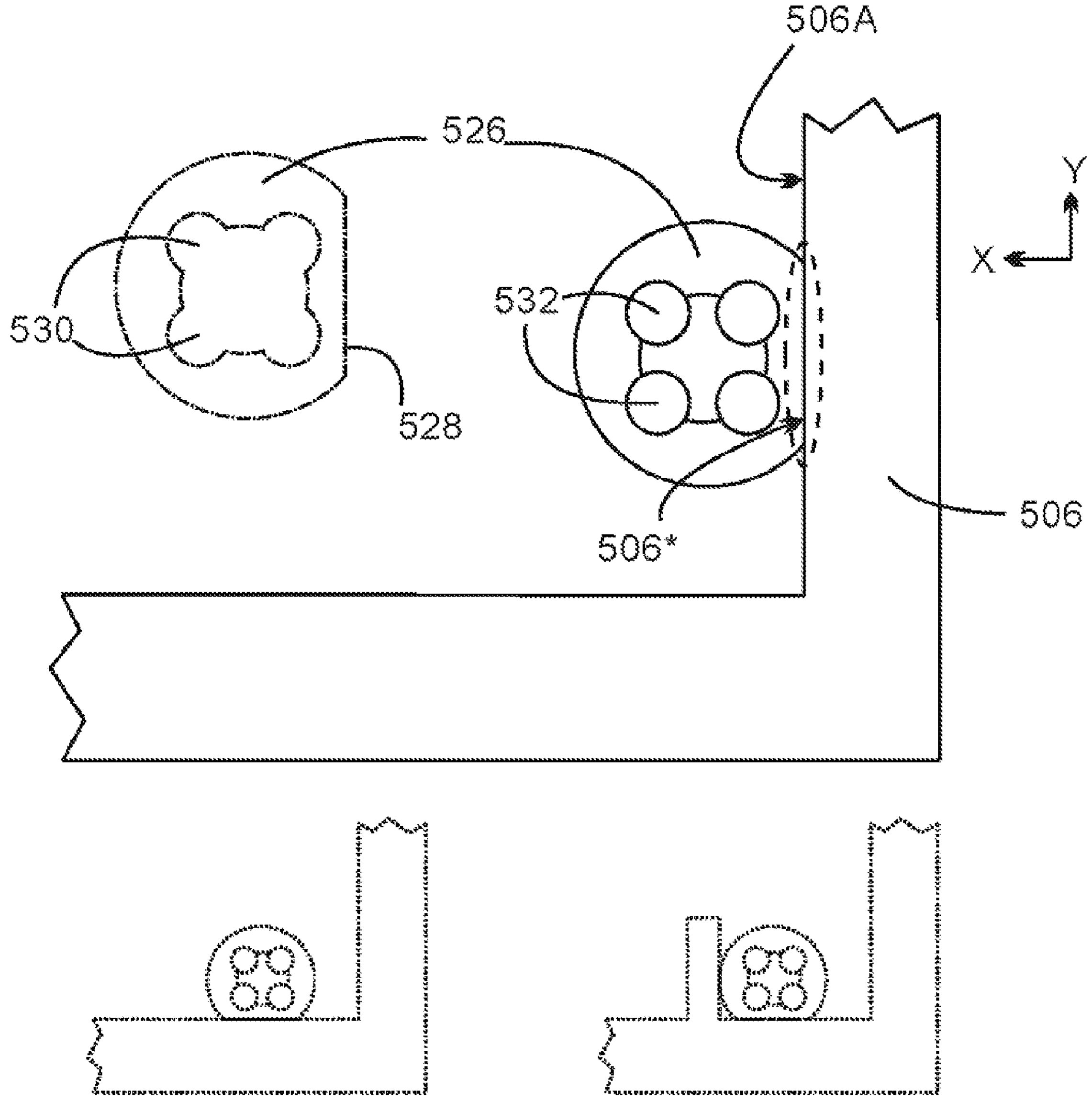
FIG. 5 shows another embodiment of the invention.

FIG. 5 shows another exemplary embodiment of the mass spectrometer according to the invention in a two-dimensional front view. The side wall 506 comprises a highly precise machined reference surface 506* facing sideways and, in this example, being machined flush with the rest of the inner surface 506A of the side wall 506. However, this arrangement is not to be construed restrictive. Other arrangements, for example stepped from the side wall and/or ground plate, are also conceivable.

A carrier or support ring 526 (shown on its own with dash-dotted lines, top-left), preferably made of an insulating material such as ceramic, generally has a round circular outer peripheral contour with one straight interception cut forming a straight edge 528. The generally round circular inner contour comprises four arcuate indentations 530 equally spaced from an imaginary center axis and precisely machined for neatly receiving a number of pole electrodes 532 therein. The single electrodes 532, in this case, are individually supported by the insulating ring 526. The number of four is given by way of example only. It is equally possible to increase the number of electrodes 532 to, for instance, six or eight in order to provide a hexapole or octopole rod assembly. Normally, three insulating rings 526 are used for assembling the multipole rods 532. For the sake of simplicity the illustration is limited to just one ring 526 in a front end view.

The embodiment shown in FIG. 5 resembles the embodiment illustrated in FIG. 2 insofar as the electrodes 532 are not all directly attached to the same surface of the support ring 526. The four electrodes 532 are directly attached to the inner contour edge whereas the ceramic support ring 526 contacts the reference surface 506* machined integrally with the side wall 506 at its outer straight cut edge 528. This embodiment gives another example of a sub-assembly in the mass spectrometer featuring an inherent position and/or alignment precision. This inherent precision of the sub-assembly essentially includes position and/or alignment precisions of the four conductive rods 532 mounted on the inner contour of the support ring 526 and the dimensional precision of the ring thickness. The inherent precision of the sub-assembly, however, is generally independent of the position and alignment precision of the sub-assembly as a whole in relation to the manifold. The latter precision is reduced to a minimum as the number of interfaces between the sub-assembly as a whole and the manifold is minimized, again to a number of one in this example (as indicated by the dashed ellipse).

Accordingly, just the outer straight edge 528 of the ceramic support ring 526 has to be machined to high precision in order to minimize position uncertainties of the electrode assembly in relation to the manifold in the X direction, at least. Therefore, the manifold, or at least the wall 506 at which the reference surface 506* is located, may act as a reliable reference frame for mounting and aligning ion optical assemblies such as the quadrupole rod assembly illustrated.

Two variants of the embodiment featuring an arrangement of a quadrupole rod assembly with insulating holder rings (dotted contours) are shown below the exemplary embodiment referred to in detail above. To the left, a reference surface is machined integrally with the ground plate of the housing, on which a straight edge of the holder ring is aligned. To the right, a reference surface is provided at the ground plate, and additionally a post machined integrally with the ground plate protrudes upwards and creates a further highly precise alignment reference surface (facing sideways in this case) for the outer contour of the, preferably highly precise machined, ceramic ring which contacts the side surface of the post tangentially. It is also conceivable to provide the insulating ring with more than one straight cut edge to obtain good positioning and alignment precision in more than one dimension.

Figure 6A:
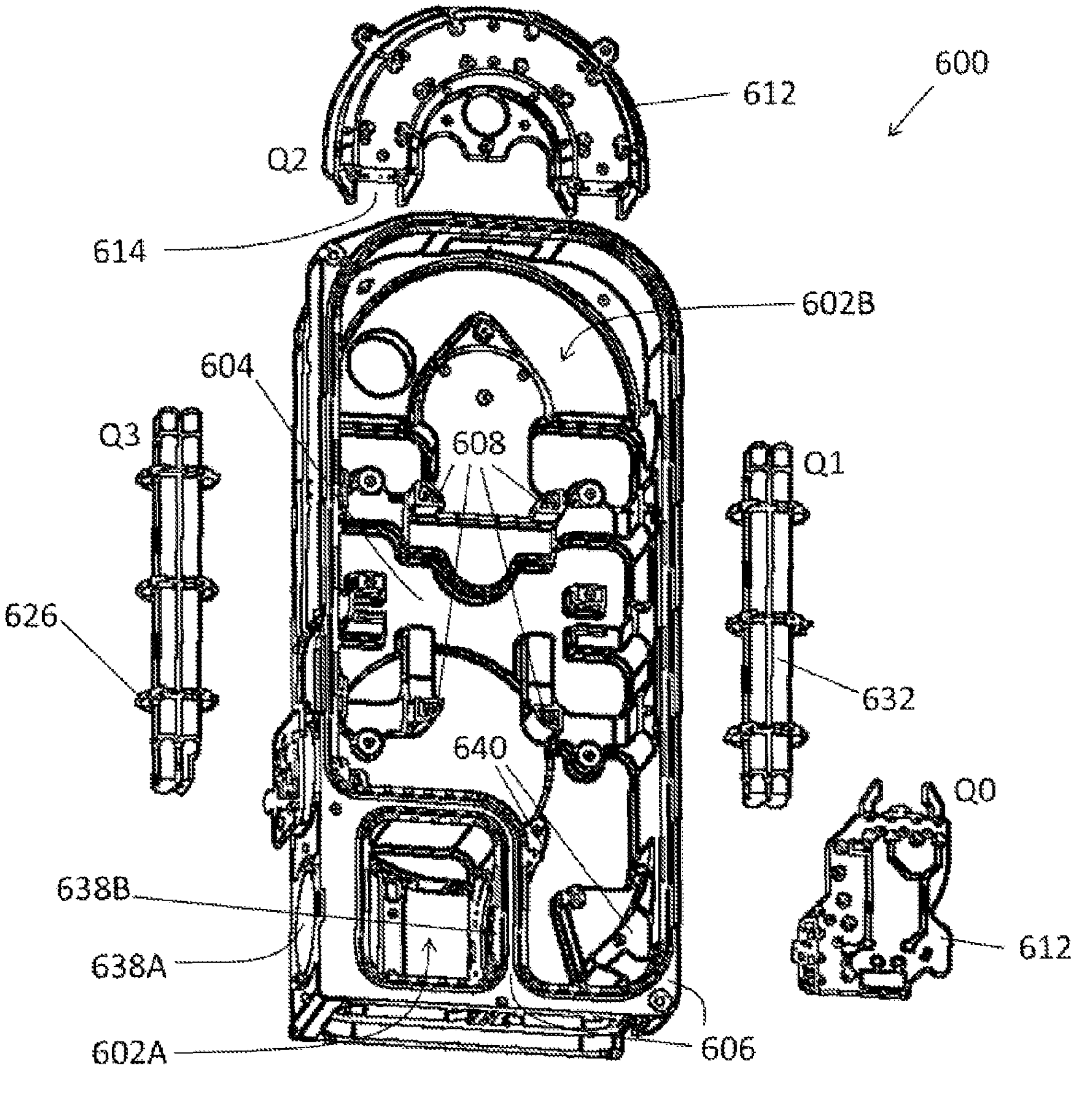
FIG. 6A to 6D shows an example of a manifold with integrally machined high-precision reference surfaces according to embodiments of the invention.

FIG. 6A shows a manifold 600 for mass spectrometers being essentially a single machined work piece and having reference surfaces integrally machined on a ground plate, walls, posts, steps and/or plateaus thereof. The manifold 600 illustrated displays the shape of a (lidless) housing with two compartments 602A, 602B intended for creating two vacuum stages and receiving an ion source (in compartment 602A; not shown) and a multipole mass analyzer assembly (in compartment 602B), respectively.

The first compartment 602A comprises a round entrance opening 638A, such as for receiving a transfer line of a gas chromatograph, not shown. Gaseous samples, being separated according to their volatility in a GC column, may be introduced via this line in an ion source (not shown) to be located in the first compartment 602A. A circular opening 638B in an inner side wall of the first compartment 602A located opposite of the entrance opening 638A allows transfer of ions generated in the ion source to the second compartment 602B and the mass analyzer Q0 to Q3 positioned therein. Components of the mass analyzer Q0 to Q3 are shown disassembled outside of the second compartment 602B of the manifold 600 for the sake of clarity. The mass analyzer comprises a curved Q0 collision cell, essentially for collisional cooling the ions in the ion beam exiting the ion source (such as disclosed in pending U.S. patent application Ser. No. 13/103,415, filed on May 9, 2011 by Felician Muntean and assigned to the assignee of the present invention). Downstream of Q0 along the ion path a triple quadrupole is located, with Q1 and Q3 consisting in this example of quadrupole rod assemblies the rods 632 thereof being fixed and aligned to one another by means of ceramic insulation rings 626 and serving as mass filters, whereas Q2 located intermediate between Q1 and Q3 is of a curved closed tube design (such as presented in U.S. Pat. No. 6,576,897) and is supplied with a collision gas to induce fragmentation of the ions exiting the first mass filter Q1. Q2, similar to Q0, has circuit boards 612 as supports for the electrode structures 614.

Q0, in this example (see enlarged top side view in FIG. 6B), can be mounted in a pendant arrangement referred to before such that a lower surface of an upper circuit board rests on reference surfaces (facing upward) machined integrally with steps 640, which in turn are machined integrally with inner or outer side walls 606 of the housing of the manifold 600. One reference surface, in this example, may comprise an alignment pin 634 which may interact with a corresponding opening 636 in the circuit board 612 of Q0 to provide a precisely positioned point of engagement of circuit board 612 and step 640 (also establishing a rotation axis), which assists in aligning the circuit board 612 in relation to a frame of reference constituted by the manifold 600 in more than one spatial dimension. For that purpose, the other reference surface facing upward machined integrally with the step 640 at the outer side wall 606 may comprise a recessed, or stepped, structure 644 on top thereof that is another example of reference surface and is machined with an inner periphery that tightly engages (at least at two or more portions) an accurately machined outer periphery of tab 646 (or outer edge contour) of the circuit board 612. When the circuit board 612 is lowered in the correct direction and with correct alignment on the two reference surfaces provided in this exemplary implementation, the pin 634 on the first step 640 engages with the opening 636, and the outer periphery of tab 646 neatly fits into and engages the inner periphery of the recessed structure 644, so that, in principle, only an upward motion of the circuit board 612 would be possible, such as for withdrawing Q0 from the manifold, whereas any rotation around the pin 634 would be impeded. It is also possible to provide fixing means which confine the circuit board 612 set in place in the manifold 600 in all six translational spatial dimensions (X, Y, Z).

Figure 6B:
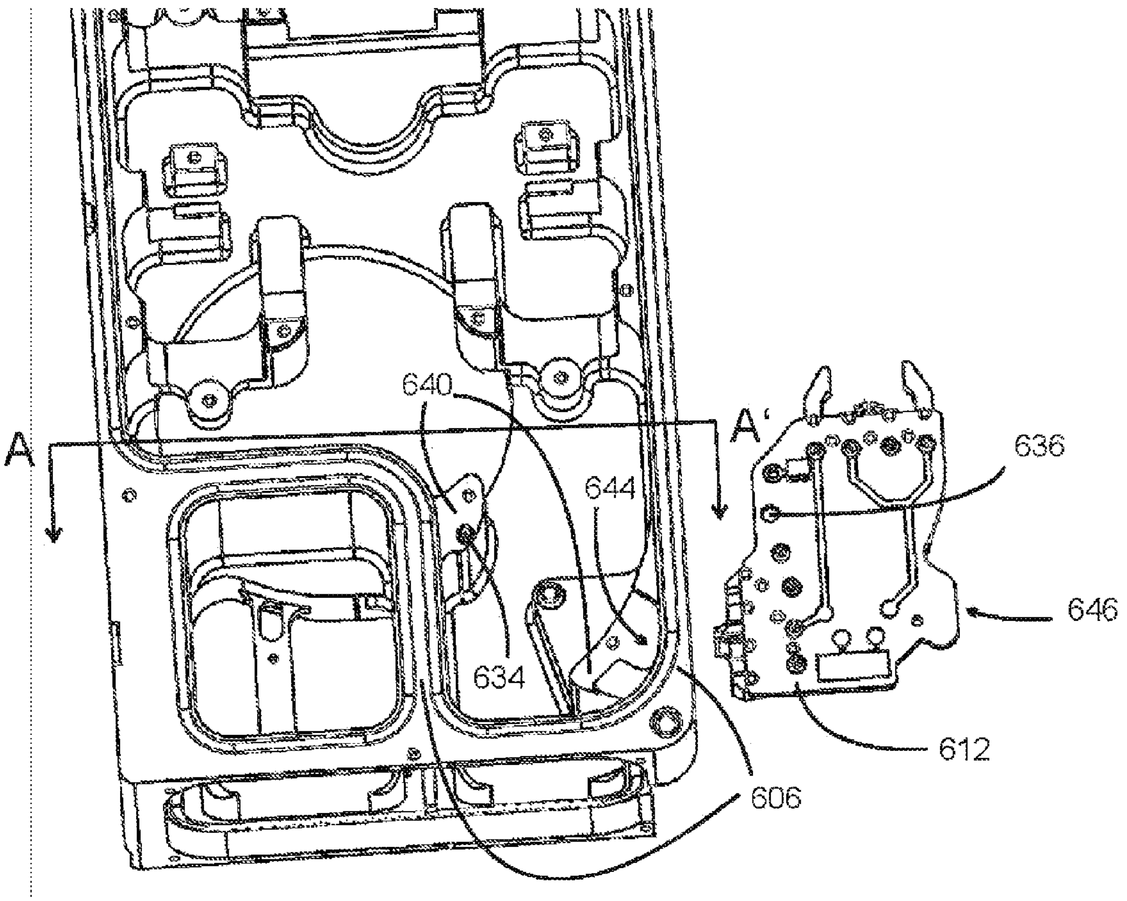
Figure 6C:
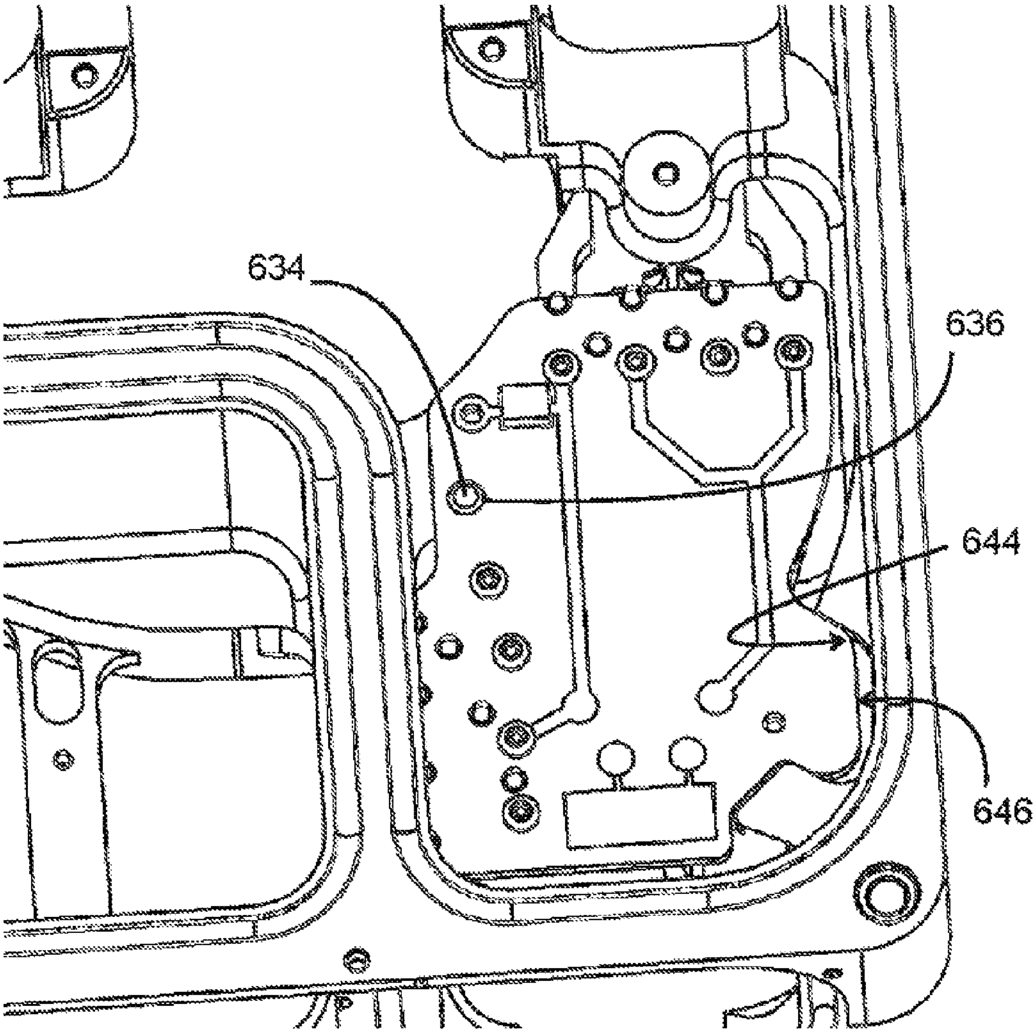

FIG. 6C shows Q0 in its position in the manifold 600 in a top view. The matching engagement of pin 634 with opening 636, as well as the tight fit of portions of structured recess 644 and outer periphery of tab 646 are apparent.

Figure 6D:
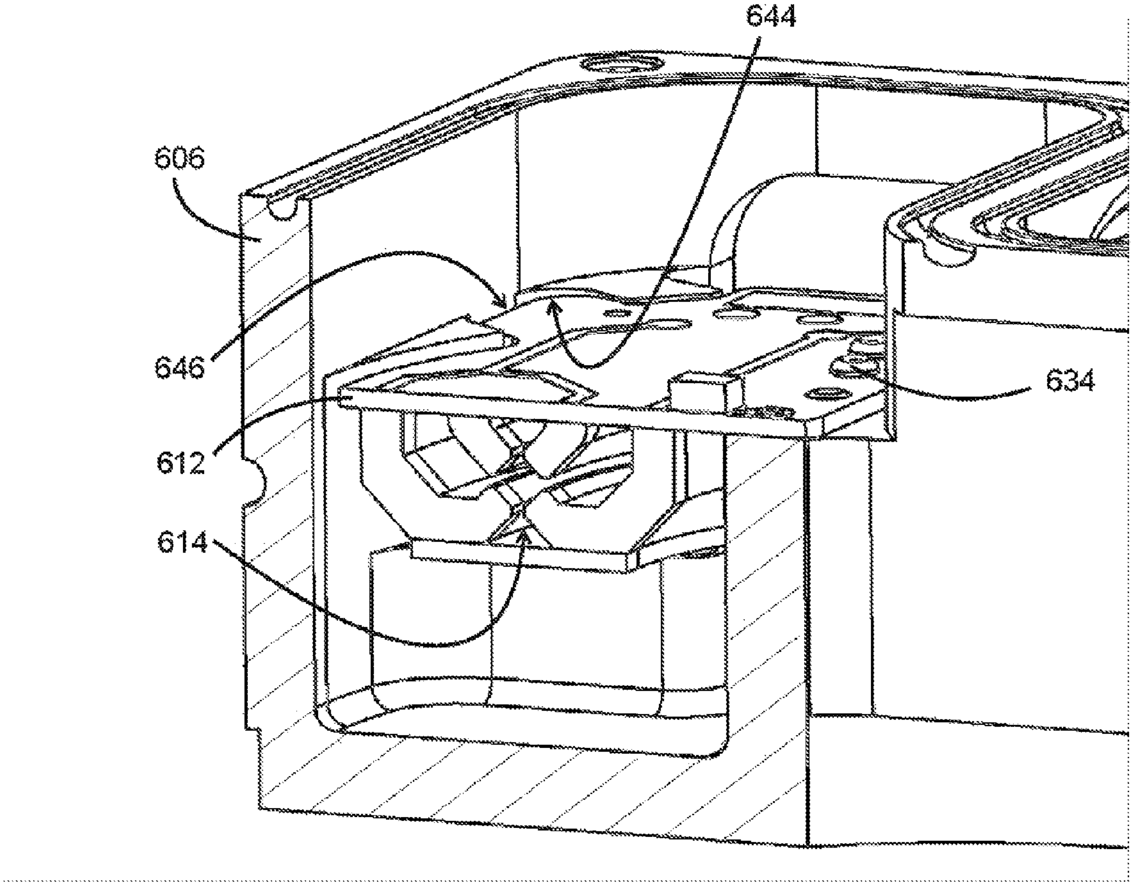

FIG. 6D, on the other hand, shows a cross sectional view based on the line A-A' in FIG. 6B with Q0 put in place in the manifold 600.

Similar arrangements are apparent also for the other parts of the mass analyzer. The insulation rings 626 of the quadrupole rod assemblies Q1, Q3, for example, are preferably designed to interact with reference surfaces made integrally with posts 608 that protrude from the ground plate 604 of the manifold 600 and are in turn made integrally therewith to minimize the number of interfaces between manifold 600 and electrodes 632 (such as pole rods).

The way of aligning and positioning the parts of the mass analyzer Q0 to Q3 can be easily extended to the positioning and alignment of Q2, the detailed presentation of which will be left out here for the sake of conciseness. Q2 can, for instance, be installed in the manifold 600 by means of the exemplary arrangement illustrated in FIG. 4.

Figure 7:
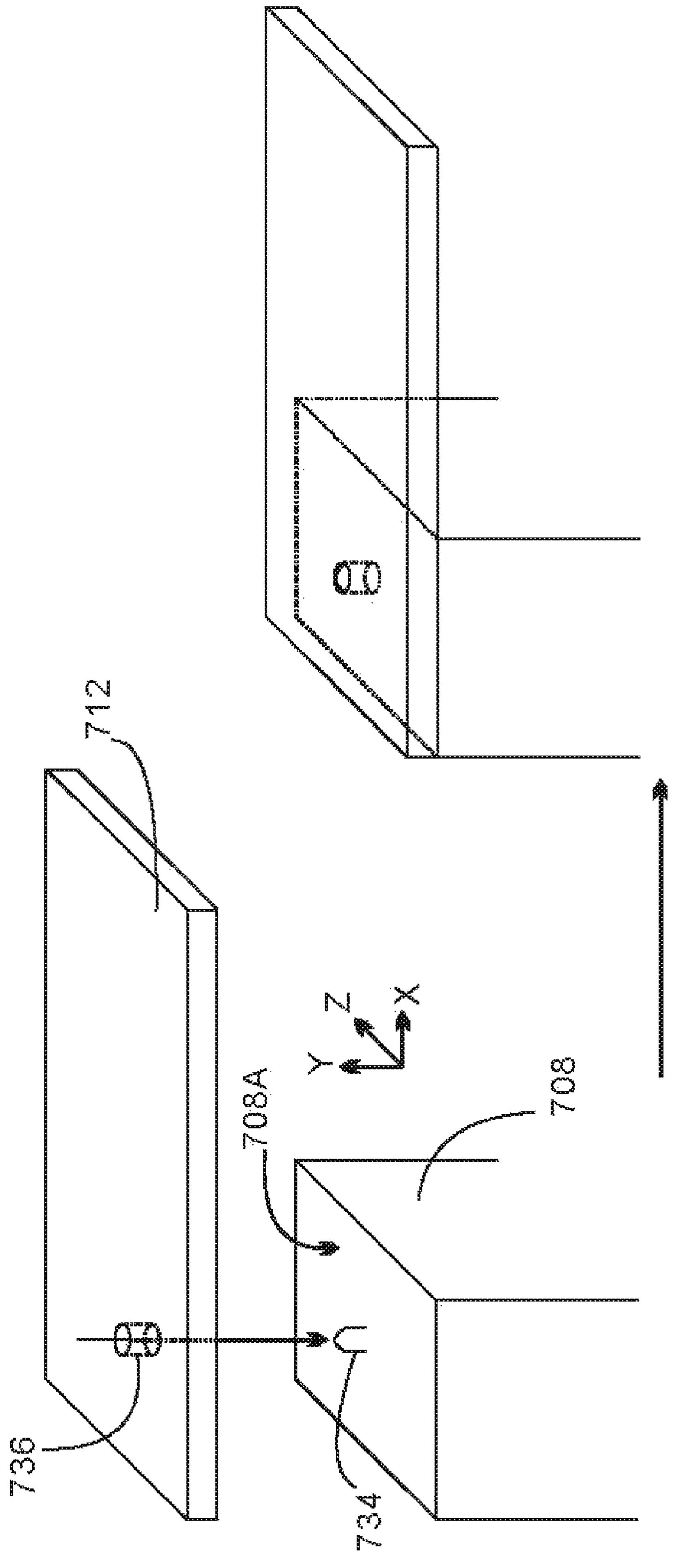
FIGS. 7 and 8 show how favorable positioning effects brought about by embodiments of the invention may be extended to more than one spatial dimension.
Figure 8:
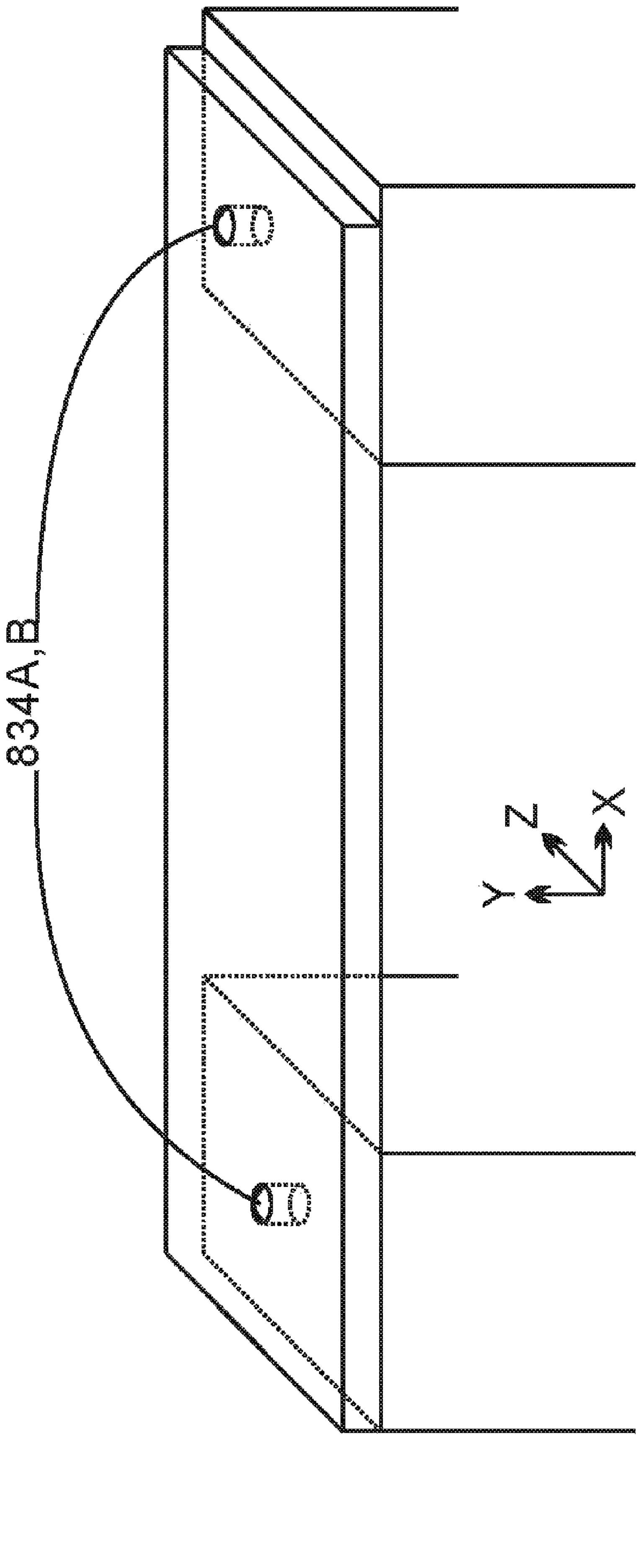

FIGS. 7 and 8 illustrate other examples of extending the previous embodiments from providing high positional and/or alignment precision in one spatial dimension or direction to at least two, preferably three, spatial dimensions. This can be achieved, for example, starting from the embodiment shown in FIG. 1 with reference surfaces on posts 708 integrally machined with the ground plate (not shown), by also integrally machining an alignment pin 734 (to high precision), preferably on the face of the reference surface 708A. When a circuit board 712, as support carrying the electrode structure (not shown), comprises an opening 736, a hole, or at least a recess at one of its side edges, being machined to substantially match the dimensions of the pin 734, it can be lowered (downward arrow; right part of illustration shows condition after completing the downward motion) on the reference surface 708A such that the alignment pin 734 engages with the opening 736, hole or recess, preferably in a sliding manner. That is, some friction should be perceptible when lowering the circuit board 712 on the reference surface 708A to make sure that the pin 734 properly engages the opening 736, hole or recess. In this manner, an additional spatial constriction for the support 712 and the electrode structure, when mounted on the manifold, can be achieved.

In order to obtain a fixed arrangement of the support on the reference surfaces, more than one alignment pin 834A, 834B can be provided, for example, on the different reference surfaces of two posts as illustrated in FIG. 8. By virtue of the contact with the reference surfaces and the two additional alignment pins engaged with appropriate counterparts, the circuit board is generally fixed to the manifold to high precision, so that the manifold can act as a high precision reference frame for the ion optical assemblies in the mass spectrometer in three spatial dimensions X, Y, Z.

It will be understood that various aspects or details of the invention may be changed, or that different aspects disclosed in conjunction with different embodiments of the invention may be readily combined if practicable, without departing from the scope of the invention. Furthermore, the foregoing description is for the purpose of illustration only, and not for the purpose of limiting the invention, which is defined solely by the appended claims.

What is claimed is:

1. A mass spectrometer comprising a manifold having walls and a base plate forming part of a housing of the mass spectrometer, and at least one multipole ion optical assembly, comprising:

the multipole ion optical assembly having a support with two sides and a plurality of electrodes, all electrodes being attached directly to one side of said support; and at least one reference surface that is integrally machined with the manifold;

wherein the side of the support to which the plurality of electrodes is directly attached contacts, and thus is aligned to, the at least one reference surface.

2. The mass spectrometer according to claim 1, wherein the manifold is a single machined work piece.

3. The mass spectrometer according to claim 1, wherein the reference surface is a surface of a recess machined integrally with the manifold.

4. The mass spectrometer according to claim 1, wherein the reference surface is a substantially planar surface at one of a post, step and plateau machined integrally with the manifold.

5. The mass spectrometer according to claim 1, wherein the walls of the housing have a height of less than 8 centimeters.

6. The mass spectrometer according to claim 5, wherein the manifold has a volume of less than 8,000 cubic centimeters.

7. The mass spectrometer according to claim 1, wherein the reference surface is a substantially planar surface at one of a step and plateau machined integrally with the walls.

8. The mass spectrometer according to claim 1, wherein the reference surface is substantially planar and comprises at least one pin protruding therefrom, and wherein the support comprises corresponding recesses or openings for aligning the support in directions essentially parallel to the reference surface such that the ion optical assembly is aligned in more than one dimension.

9. The mass spectrometer according to claim 1, wherein the ion optical assembly is an RF multipole electrode assembly, wherein the support is a substantially planar printed circuit board having two surfaces, and wherein all the electrodes are mounted on one surface of the printed circuit board and that one surface contacts, and thus is aligned to, the reference surface.

10. The mass spectrometer according to claim 1, wherein the support is rigidly attached to the at least one reference surface by one of: adhesion, screwing and clamping.

11. The mass spectrometer according to claim 1, wherein the shape accuracy and the position accuracy of the reference surface is better than ten micrometers each.

12. The mass spectrometer according to claim 1, wherein a position accuracy of the ion optical assembly is better than one hundred micrometers.

13. A mass spectrometer comprising a manifold having walls and a base plate forming part of a housing of the mass spectrometer, and at least one multipole ion optical assembly, comprising:

the multipole ion optical assembly having a support with an adjustment surface, and a plurality of electrodes, all of which are attached and aligned to said adjustment surface; and a reference surface being a substantially planar surface at a protruding feature having the shape of one of a post, step and plateau, machined integrally with the manifold;

wherein a side of the support opposing the adjustment surface contacts the reference surface and thus aliens the adjustment surface to the reference surface.

14. The mass spectrometer according to claim 13, wherein the adjustment surface is machined at the support.

15. The mass spectrometer according to claim 13, wherein the support is one of an insulating ring and a circuit board.

16. The mass spectrometer according to claim 13, wherein the reference surface and the adjustment surface contact each other over a surface area.

17. A mass spectrometer comprising a manifold having walls and a base plate forming part of a housing of the mass spectrometer, and at least one multipole ion optical assembly, comprising: the multipole ion optical assembly having a support with two sides and a plurality of electrodes, all of which are attached to a first side of said support, a pair of said electrodes of the plurality of electrodes being directly attached to said first side of said support; and at least one reference surface that is integrally machined with the manifold; wherein the side of the support to which the electrodes are directly attached contacts, and thus is aligned to, the at least one reference surface.

* * * * *